(12) United States Patent
Argentar

(10) Patent No.: US 7,510,477 B2
(45) Date of Patent: Mar. 31, 2009

(54) CONTROL APPARATUS FOR USE WITH A COMPUTER OR VIDEO GAME SYSTEM

(76) Inventor: Eric J. Argentar, 558 Montgomery St., Brooklyn, NY (US) 11225

( * ) Notice: Subject to any disclaimer, the term of this patent is extended or adjusted under 35 U.S.C. 154(b) by 735 days.

(21) Appl. No.: 10/733,731

(22) Filed: Dec. 11, 2003

(65) Prior Publication Data

US 2005/0130739 A1    Jun. 16, 2005

(51) Int. Cl.
*A63F 13/00* (2006.01)
(52) U.S. Cl. .............................. 463/36; 463/37; 463/46; 434/16; 345/156; 345/158; 345/163
(58) Field of Classification Search ................... 463/37, 463/1–5, 36, 38; 345/158
See application file for complete search history.

(56) References Cited

U.S. PATENT DOCUMENTS

| | | | | |
|---|---|---|---|---|
| 6,545,661 | B1 * | 4/2003 | Goschy et al. | 345/158 |
| 6,569,019 | B2 * | 5/2003 | Cochran | 463/37 |
| 6,672,962 | B1 * | 1/2004 | Ozaki et al. | 463/37 |
| 6,902,482 | B1 * | 6/2005 | Woolston | 463/37 |
| 6,902,483 | B2 * | 6/2005 | Lin | 463/37 |
| 6,931,775 | B2 * | 8/2005 | Burnett | 42/72 |
| 7,145,551 | B1 * | 12/2006 | Bathiche et al. | 345/158 |
| 2002/0171625 | A1 * | 11/2002 | Rothchild | 345/156 |
| 2003/0195041 | A1 * | 10/2003 | McCauley | 463/37 |

OTHER PUBLICATIONS

"VR Gun System Specifications" http://web.archive.org/web/20030623201323/http://vrimmersions.com/VRGunspec.htm posted on Jun. 23, 2003, retrieved on May 23, 2007.*
"Custom VR Systems" http://web.archive.org/web/20030213062555/http://www.vrimmersions.com/systems.htm posted on Feb. 13, 2003 retrieved on May 23, 2007.*
"Heckler and Koch MP5", http://en.wikipedia.org/wiki/Heckler_&_Koch_MP5, retrieved on May 24, 2007.*
Kevin Mellot & Joseph Flores, "VR Gun System" located at URL: http://www.geocities.com/mellott124/VRGun/VRGunSystem2.doc.
Web Page at URL: http://www.geocities.com/mellott124/VRGun/VRGunUSBStartup.doc.

(Continued)

*Primary Examiner*—John M Hotaling, II
*Assistant Examiner*—Ross A. Williams
(74) *Attorney, Agent, or Firm*—Lawrence C. Edelman, Esq.

(57) ABSTRACT

A control device for controlling a display of a computer system for use with a video game includes a coordinate control unit for providing information related to a vertical and horizontal tilt of the control device, a mouse control unit for inputting conventional mouse input information, a game control unit for inputting game control information and a controller for processing the information provided by the coordinate control unit, mouse control unit and game control unit. The vertical and horizontal point of view of the user in the video game and/or the vertical and horizontal position of a cursor on the display is determined based on the information related to the vertical and horizontal tilt of the control device. The control device is preferably shaped like a firearm to enhance the realism of the video game, but may be shaped like a conventional game pad.

45 Claims, 12 Drawing Sheets

OTHER PUBLICATIONS

Web Page at URL: http://www.geocities.com/mellott124/VRGun/VRGunblk.jpg.
Web Page at URL: http://www.geocities.com/mellott124/VRGun/VRGunblock.jpg.
Web Page at URL: http://www.geocities.com/mellott124/VRGun/VRGunblock1.jpg.
Web Page at URL: http://www.geocities.com/mellott124/VRGun/VRGunblock2.jpg.
Web Page at URL: http://www.geocities.com/mellott124/VRGun/VRGunbox.jpg.
Web Page at URL: http://www.geocities.com/mellott124/VRGun/VRGunboxpic.jpg.
Web Page at URL: http://www.geocities.com/mellott124/VRGun/VRGuninside.jpg.
Web Page at URL: http://www.geocities.com/mellott124/VRGun/VRGunparts.jpg.
Web Page at URL: http://www.geocities.com/mellott124/VRGun/fps1.jpg.
Web Page at URL: http://www.geocities.com/mellott124/VRGun/fps3.jpg.
Web Page at URL: http://www.geocities.com/mellott124/VRGun/1-2.jpg.
Web Page at URL: http://www.geocities.com/mellott124/vrSystems.htm?200531.
Web Page at URL: http://www.cwonline.com/store/view_product.asp?Product=1225.
Web Page at URL: http://www.mostergecko.com/products/html.
Document entitled "VrZgunBuild.doc" found on web page at URL: www.vrimmersions.com.
Document entitled "Index of/mellot124/VRGun" located at URL: http://www.geocities.com/mellott124/VRGun/.

* cited by examiner

CONTROL APPARATUS FOR USE WITH A COMPUTER OR VIDEO GAME SYSTEM

FIELD OF THE INVENTION

The present application is related to a control device for use with a computer system. More specifically, the invention relates to a control device for controlling a display of the computer system based on the horizontal and vertical tilt of the control device for use with a video game.

BACKGROUND OF THE INVENTION

As computers have become a part of every day life, video games playable on computers have similarly become a very popular means of entertainment. While software and computer graphics innovations have made video games very realistic, most video games rely on more contemporary input devices such as a keyboard, computer mouse or joystick to allow a player to interact with the video game. While these traditional input devices are familiar to most users and easy to operate, they tend to take away from the realism of the video game.

Furthermore, the improvements that have been made to video games have added many options and features that were simply not available previously. As a result, these traditional control devices lack the functionality to provide for the control of these additional functions and features. Users typically must use multiple control devices within the same game to allow for control of all features. For example, it is quite common for users to utilize a computer mouse along with extensive use of the keyboard to input commands and perform actions in the video game because the computer mouse alone simply lacks sufficient functionality for today's video games. The use of multiple input devices complicates the playing of these video games to the point where the user must spend a significant amount of time simply familiarizing himself with the control devices prior to even attempting to proceed with playing the game. Naturally, this robs the user of both a sense of reality while playing the game and takes away from the user's enjoyment.

The computer mouse allows a user to position a cursor on a display of a computer system by moving the mouse along a flat surface. A mouse ball in the base of the mouse rotates as the mouse is moved. The rotation of the mouse ball is correlated to movement of the cursor on the screen. More recently, trackballs have been introduced to allow a user to position a cursor on the display of the computer system by manually rotating the track ball. The rotation of the track ball is similarly correlated to the positioning of the cursor on the display. However, the mouse requires a large, flat and substantially smooth two dimensional surface over which the mouse moves and thus, the user is somewhat restricted in where he or she can use the mouse while still maintaining good control over positioning of the cursor. While trackballs eliminate the need for a large flat surface, they are typically mounted on the keyboard or some other computer system component, which tends to limit where the user can utilize the trackball as well. In addition, as noted above, both the computer mouse and trackball lack the functionality required to utilize the additional features and options available in advanced video games, thus necessitating the use of additional control or input devices and complicating video game play.

Joysticks may provide a more realistic effect for certain video games. For example, joysticks are similar in design to control sticks used in aircraft, and therefore, tend to add to the realism in a flight simulation video game. However, many do not add to realism in many other video games. While some joysticks may include additional control inputs, and thus, provide for increased functionality, even these joysticks do not provide sufficient functionality to satisfy the requirements of advanced video games and typically require the contemporaneous use of the keyboard.

Control devices that can be manipulated in free space to control a display of the computer system have been developed to free users from some of the restrictions of traditional control devices. Some control devices utilize sonic positioning. Typically, an ultrasonic transmitter in the device is monitored by an array of sensors. The position of the cursor on the screen is correlated to the position of the ultrasonic transmitter in the device relative to the array of sensors. Thus, these devices are limited in that they rely on an array of receivers and have range limits. In addition, they these control devices also lack functionality sufficient to play today's advanced video games.

More recently, gyroscopes have been incorporated into control devices in order to allow users to manipulate control devices in free space and position the cursor on the display by pointing the device at the desired position on the display (see, for example, U.S. Pat. No. 5,825,350 to Case, Jr. et al.). Gyroscopes have long been used in aircraft to provide inertial space reference and to measure pitch and roll relative to the gravitational vector. In control devices utilizing gyroscopes, motion of the device in free space is typically translated into motion of the cursor on the display. More specifically, the vertical and horizontal tilt of the control device is translated into the desired position of a cursor on the display of the computer system. These devices typically include a computer mouse function as well and may be connected to the computer system in a manner substantially similar to that of a conventional computer mouse. While these devices allow a user more freedom in using the device, these devices do not make a video game experience any more realistic, as they tend to be substantially similar in size and shape to the traditional computer mouse and thus offer little realism. Further, these devices function in a manner similar to the computer mouse and thus have similar limited functionality which means they are insufficient to control the additional options and features of today's advanced video games.

In addition, light guns have been developed for use with video games. These devices typically are shaped like a fire arm and project a beam of light. A screen placed over the display of the computer system senses this beam of light and is used to indicate a location on the display at which the user is aiming. These devices do provide some more realism, however, they are only useful for targeting in the video game. In addition, the user must point the light gun at the display in order to use it, which limits where the user can play the video game.

Accordingly, it is desirable to provide a control device for a computer system that is more realistic in shape and more intuitive in operation while also providing increased functionality for use with today's video games.

SUMMARY OF THE INVENTION

A control device for controlling a display of a computer system for use with a video game includes a coordinate control unit adapted to input information related to a vertical and a horizontal tilt of the control device, a mouse control unit adapted to input computer mouse input information, a game play control unit adapted to input game play information and a controller adapted to process input information from the coordinate control unit, mouse control unit and game play control unit to provide game information to the computer system.

The control device may have a shape substantially similar to a firearm including a central body, a handgrip extending downward from a rear section of the central body, a barrel extending longitudinally forward from the central body and a trigger extending downward from the central body in front of the handgrip.

The coordinate control unit may include a y-axis sensor adapted to input information regarding a tilt of the barrel of the control device in a vertical direction and an x-axis sensor adapted to input information regarding a tilt of the barrel of the control device in a horizontal direction. The y-axis sensor may include a horizontal shaft attached to a side of the barrel that rotates as the barrel is tilted upward and downward, a first optical disk attached to the horizontal shaft such that the optical disk rotates with the horizontal shaft and at least one optical encoder adapted to correlate rotation of the optical disk to vertical tilt of the barrel to provide information indicating a desired vertical point of view of a user in the video game or a desired vertical position of a cursor on the display. The x-axis sensor may include a vertical shaft connected to the y-axis sensor such that the vertical shaft rotates as the barrel is tilted left and right, a second optical encoder disk attached to the vertical shaft such that the second optical disk rotates with the vertical shaft and at least one second optical encoder adapted to correlate the rotation of the second optical disk to a horizontal tilt of the barrel to provide information indicating a desired horizontal point of view of a user in the video game.

The coordinate control unit may include at least one gyroscope adapted to provide information regarding the vertical and horizontal tilt of the control device in order to provide information regarding a desired vertical and horizontal point of view of the user in the video game or a desired vertical and horizontal position of the cursor on the display.

The mouse control unit may include a mouse wheel adapted to provide information to scroll up or down on the display, a left mouse button adapted to provide information regarding selections of a user and a right mouse button adapted to provide information regarding other selections of a user. The mouse wheel, the left mouse button and the right mouse button may be mounted on a side of the central body of the control device such that positioning a finger of a user proximate to the trigger operates the mouse wheel, left mouse button and right mouse button.

The game play control unit may include a directional controller adapted to input information regarding longitudinal and lateral movement in space, a plurality of buttons adapted to provide information regarding a plurality of actions performed on the display, the plurality of actions including running, crouching, jumping and selecting weapons and a coordinate activation button adapted to enable input of information from the coordinate control unit while depressed. The plurality of controls may be positioned on the hand grip of the control device such that the game play controls are operable by a thumb of the user gripping the hand grip.

A fore grip may extend down from the barrel of the weapon and the directional controller may be positioned on the fore grip and operable by a thumb and fingers of a second hand of the user gripping the fore grip. The directional controller may be positioned on the barrel of the control device.

The game play control unit may include a shoot button mounted on the trigger of the control device.

The control device may also include a removable shoulder stock extending behind the central body of the control device and adapted to steady the control device against a shoulder of the user.

The control device may include a display unit mounted on the control device to provide additional image information to a user of the control device and may include a feedback unit adapted to provide tactile feedback to a user of the control device.

A method for positioning a cursor on a display of a computer system includes receiving information from a coordinate control unit related to a vertical and a horizontal tilt of a control device, receiving computer mouse input information from a mouse control unit, receiving information from a game play control unit and providing game information based on information received from the coordinate control unit, mouse control unit and game play control unit.

The control unit may have a shape substantially similar to a firearm including a central body, a handgrip extending downward from a rear section of the central body, a barrel extending longitudinally forward from the central body and a trigger extending downward from the central body in front of the handgrip.

The step of receiving information related to the vertical and horizontal tilt of the control device may include receiving information regarding a tilt of the barrel relative to a centered vertical position of the control device from a y-axis sensor and receiving information regarding a tilt of the barrel relative to a centered horizontal position from an x-axis sensor. The step of receiving information from the y-axis sensor may include attaching a horizontal shaft to a side of the barrel that rotates as the barrel is tilted upward and downward, connecting a first optical disk attached to the horizontal shaft such that the optical disk rotates with the horizontal shaft and providing at least one optical encoder adapted to correlate rotation of the optical disk to vertical tilt of the barrel to provide information indicating a desired vertical point of view of a user in the video game.

The step of receiving information from the x-axis sensor may include connecting a vertical shaft to the y-axis sensor such that the vertical shaft rotates as the barrel is tilted left and right, connecting a second optical encoder disk attached to the vertical shaft such that the second optical disk rotates with the vertical shaft and providing at least one second optical encoder adapted to correlate the rotation of the second optical disk to a horizontal tilt of the barrel to provide information indicating a desired horizontal point of view of a user in the video game.

The step of receiving information from the coordinate control unit may include attaching at least one gyroscope to the control device and receiving information regarding the vertical and horizontal tilt of the control device from the gyroscope in order to provide information regarding the desired vertical and horizontal point of view of a user in the video game.

The step of receiving mouse control information may include receiving information related to scrolling Up and down on the display, receiving information regarding selections of a user from a left mouse button and receiving information regarding other selections of a user from a right mouse button. The mouse wheel, the left mouse button and the right mouse button may be mounted on a side of the central body of the control device such that positioning a finger of a user proximate to the trigger operates the mouse wheel, left mouse button and right mouse button.

The step of receiving information from a game play control unit may include receiving input information regarding longitudinal and lateral movement of a character on the display in space from a direction control unit, receiving information regarding a plurality of actions performed by the character on the display, from a plurality of controls and receiving activation information from a coordinate activation button to enable input of information from the coordinate control unit. The controls may be positioned on the hand grip of the control device such that the controls are operable by a thumb of the user gripping the handgrip. The direction control unit may also be positioned on a fore grip, extending down from the barrel of the weapon and operable by a thumb and fingers of a second hand of the user gripping the fore grip. The plurality of controls may include a shoot button mounted on the trigger of the control device.

The control device further may include a removable shoulder stock extending behind the central body of the control device and adapted to steady the control device against a shoulder of the use.

The method may include receiving additional image information to be displayed to a user via a display unit and/or receiving feedback information for providing tactile feedback to a user via a feedback unit.

A control device according to an embodiment of the present application for controlling a display of a computer system for use with a video game may include a coordinate control unit adapted to input information related to a vertical and a horizontal tilt of the control, a mouse control unit adapted to input computer mouse input information, a game play control unit adapted to input game play information and a controller adapted to process input information from the coordinate control unit, mouse control unit and game play control unit to provide game information to the computer system. The control device may be substantially u-shaped including a first open end, a second open end, and a connected end connecting the first open end and the second open end.

The coordinate control unit may include a y-axis sensor adapted to input information regarding a tilt of the control device in a vertical direction and an x-axis sensor adapted to input information regarding a tilt of the control device in a horizontal direction. The y-axis sensor may include a horizontal shaft attached to a side of the control device that rotates as the control device is tilted upward and downward, a first optical disk attached to the horizontal shaft such that the optical disk rotates with the horizontal shaft and at least one optical encoder adapted to correlate rotation of the optical disk to vertical tilt of the control device to provide information indicating a desired vertical point of view of a user in the video game. The x-axis sensor may include a vertical shaft connected to the y-axis sensor such that the vertical shaft rotates as the control device is tilted left and right, a second optical encoder disk attached to the vertical shaft such that the second optical disk rotates with the vertical shaft and at least one second optical encoder adapted to correlate the rotation of the second optical disk to a horizontal tilt of the control device to provide information indicating a desired horizontal point of view of a user in the video game.

The y-axis sensor and the x-axis sensor may be positioned in a substantially u-shaped base Such that the y-axis sensor detects rotation of a connecting member extending vertically from the base to the control device forward and backward to determine the vertical tilt of the control device and the x-axis sensor detects rotation of the connecting member left and right to determine the horizontal tilt of the control device.

The coordinate control unit may include at least one gyroscope adapted to provide information regarding the vertical and horizontal tilt of the control device in order to provide information regarding a desired vertical and horizontal point of view of a user in the video game.

The mouse control unit may include a mouse wheel adapted to provide information to scroll up or down on the display, a left mouse button adapted to provide information regarding selections of a user and a right mouse button adapted to provide information regarding other selections of a user. The mouse wheel, the left mouse button and the right mouse button may be mounted in a substantially centered position on a top surface of the connected end of the control device. The mouse wheel, the left mouse button and the right mouse button may be mounted in an off centered position on a top surface of the connected end of the control device.

The game play control unit may include a directional controller adapted to input information regarding longitudinal and lateral movement in space positioned on the left side of the top surface of the connected end such that the directional controller is easily manipulated by the left thumb of the user, a plurality of buttons adapted to provide information regarding a plurality of actions performed on the display, the plurality of actions including running, crouching, jumping and special actions and positioned on the right side of the top surface of the control device such that the plurality of buttons are easily manipulated by the right thumb of the user and a coordinate activation button adapted to enable input of information from the coordinate control unit while depressed and positioned on a front surface of the connected end of the control device. Of course, the control unit may be constructed in a mirror format so that the right and left sides are reversed.

The control device may include a display unit mounted on the control device to provide additional image information to a user of the control device and/or a feedback unit adapted to provide tactile feedback to a user of the control device.

DETAILED DESCRIPTION

The control device 10 of the present application is particularly well suited for use by a player of a first person "shooter" type video game. In such video games, the player typically is presented with a first person view of an environment in the video game and is asked to aim at and shoot various targets. The user is commonly provided with a crosshair or other target designation, typically, in the center of the display. The point of view of the user in the game typically moves left, right, up, down, etc. based on the input from the computer mouse, keyboard, etc. to allow the user to aim at various targets in the video game. Targeting or aiming is typically accomplished by positioning the crosshair at the desired position, generally using the computer mouse or keyboard to change the point of view of the user in the video game or otherwise position the crosshair on the display in the video game. Shooting the target is typically accomplished by pressing a dedicated shoot button. The dedicated shoot button is typically one of the mouse buttons or a key on the keyboard. Similarly, joysticks may also be used to change the point if view of the user in the game and shooting is typically accomplished by pressing a shoot button, generally on the top of the joystick or on a base of the joystick. A control device that can quickly change the point of view of the user by simply moving the control device provides more intuitive and realistic interaction with the video game. While the control device of the present disclosure is particularly well suited for use in such video games, the control device is preferably operable with any video game and may be used as a mouse in conventional computer applications as well. In addition, the control device of the present disclosure is preferably compatible with video game systems such as the SONY PLAYSTATION 2®, a registered trademark of Sony Computer Entertainment, Inc. Similarly, the control device may be utilized with other computer simulations and virtual reality systems such as those commonly used by law enforcement and military agencies as training aids.

Figure 1:
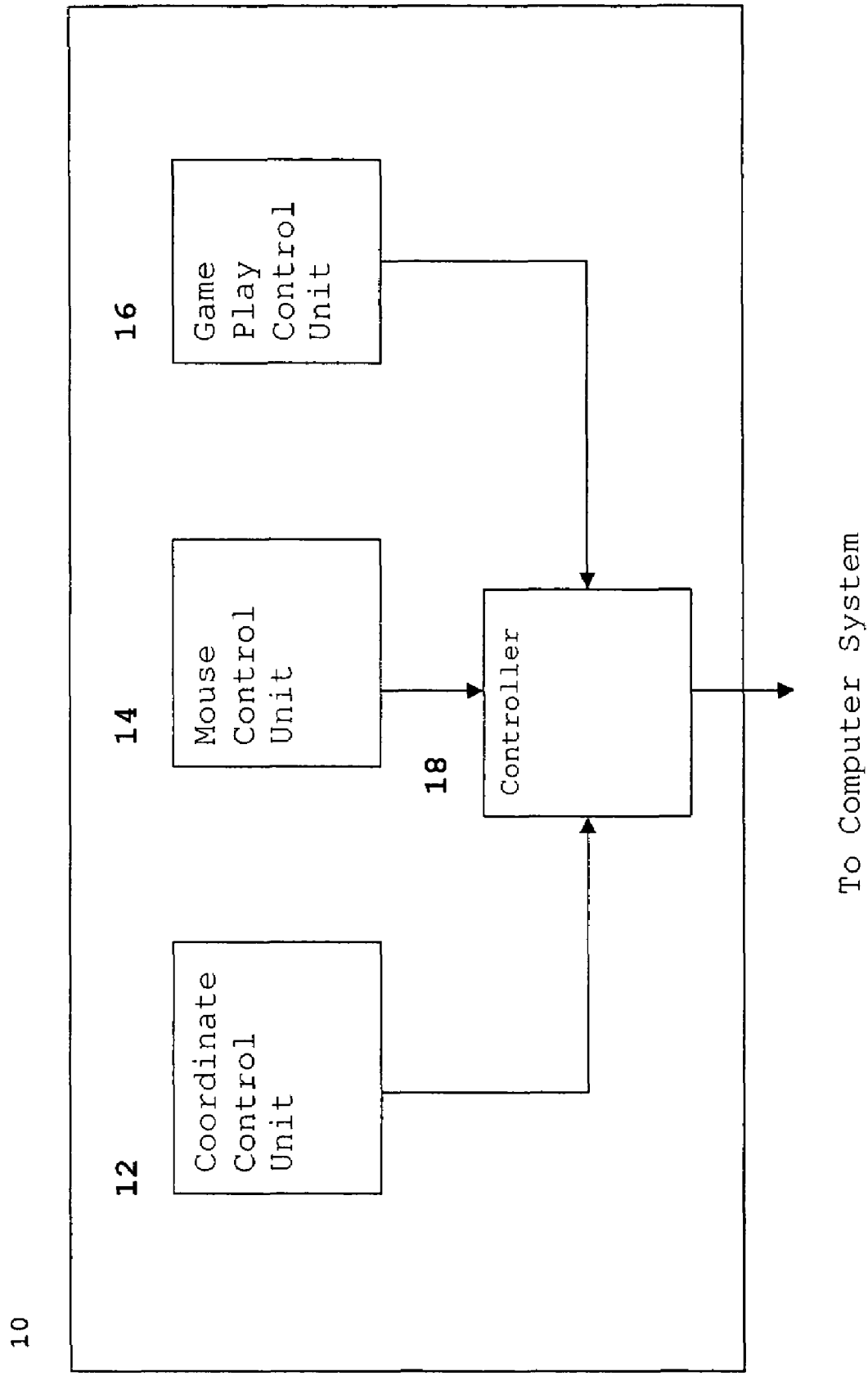
FIG. 1 is a block diagram of a control device according to an embodiment of the present invention.

A control device 10 according to a first embodiment of the present invention is described with reference to FIG. 1. A coordinate control unit 12 is used to input information regarding the desired horizontal and vertical point of view of the user in the video game. More specifically, the coordinate control unit 12 may be used to provide information related to pitch, the vertical tilt, and yaw, the horizontal tilt, of the control device 10 to indicate the desired horizontal and vertical point of view of the display of the computer system. A mouse control unit 14 provides traditional computer mouse input information. A game play control unit 16 provides additional conventional game play input information. Controller 18 receives information from the coordinate control unit 12, mouse control unit 14 and game play control unit 16 and provides game play information to the computer system. In this manner, the control device of the present application includes substantially all of the functionality required to play today's advanced video games.

Figure 2:
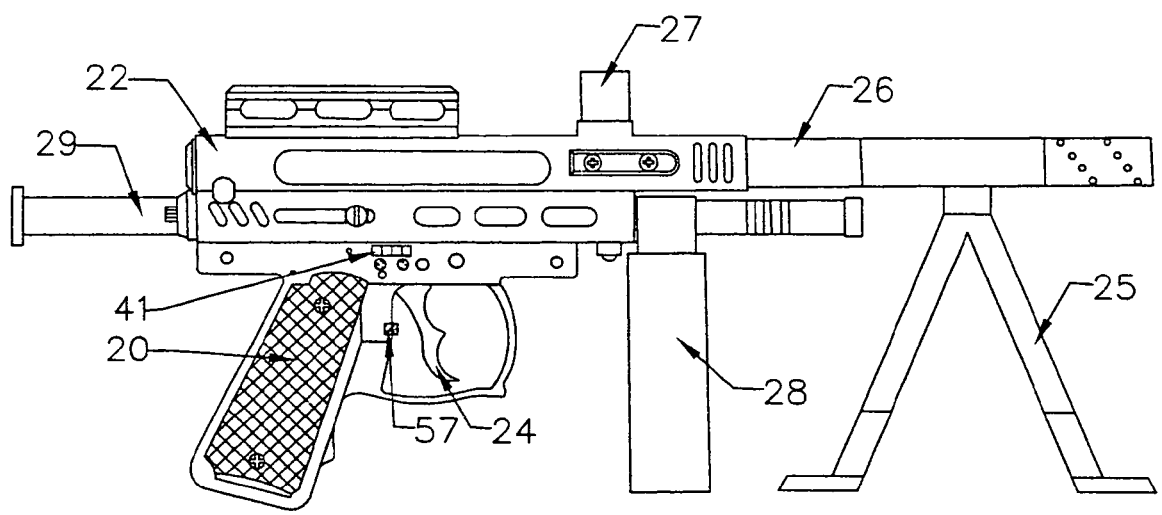
FIG. 2 shows a particular form of the control device according to an embodiment of the present invention.

A preferred shape of the control device is described further with reference to FIG. 2. The control device 10 is preferably shaped as a firearm, that is, the control device 10 includes a hand grip 20 positioned below a rear section of a central body 22. A trigger 24 extends down from the central body 22 in front of the hand grip 20. A barrel 26 extends forward from the central body 22. An adjustable fore grip 28 may extend downward from the barrel 26 in front of the trigger. For increased reality, the control device 10 may include a removable stock 29, which can be used to steady the control device 10 against the user's shoulder. This will increase stability of the control device 10. The control device 10 may also be configured as a pistol, another firearm, a pointer or the like. While a firearm is the desired shape of the control device, other shapes may be used, and the invention is not limited to that shape.

Figure 2A:
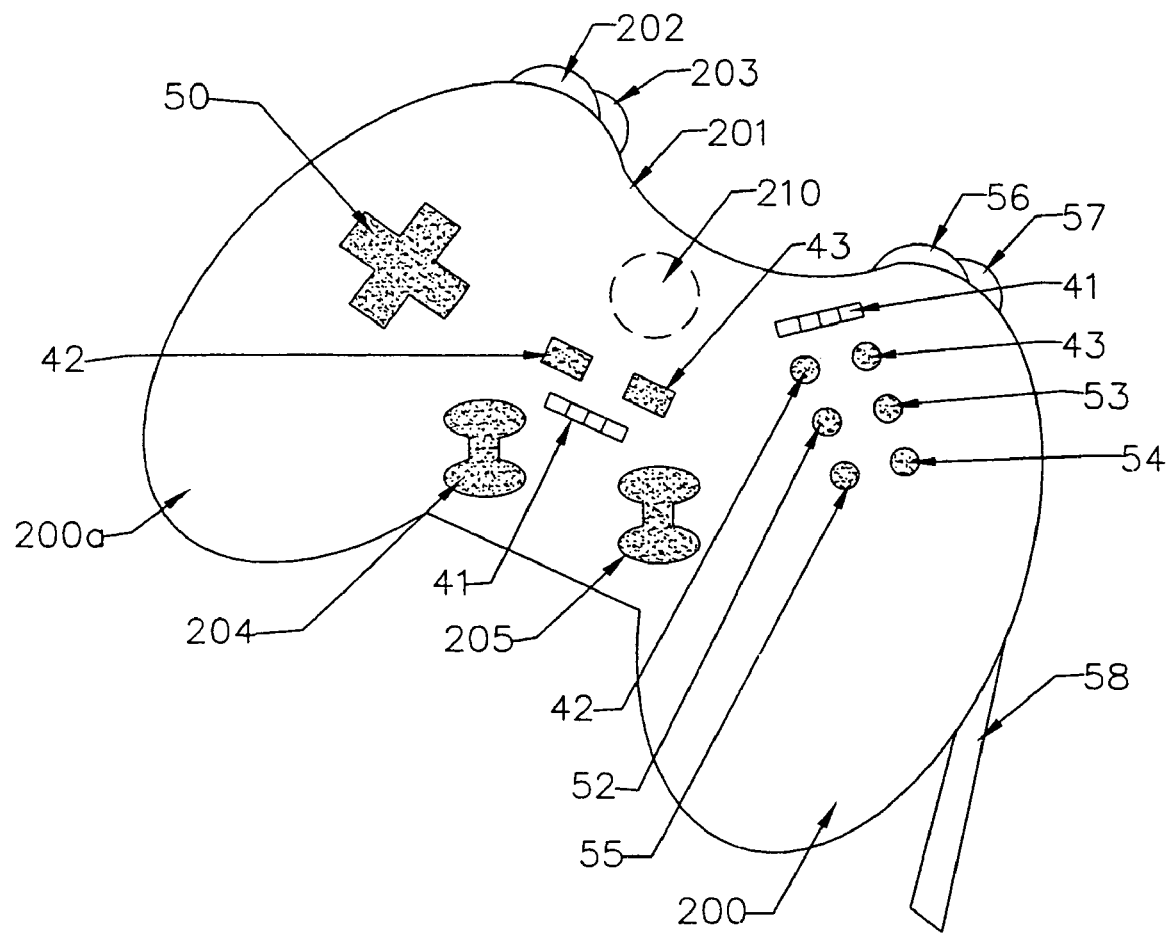
FIG. 2A shows a particular form of the control device according to another embodiment of the present invention.

The control device 10 may be shaped as a game pad as illustrated in FIG. 2A for example. Such game pads are typically substantially U-shaped. The user grasps the device by the free ends 200, 200a of the U-shape, typically grasping each end with a hand such that the user's finger curl around the free ends. The free ends 200, 200a may have a slight downward angle. The connected end 201 of the U-shape typically includes controls for point of view, longitudinal and lateral movement and various game play buttons.

In one embodiment, the coordinate control unit 12 is integrated with a bipod 25 or tripod (not shown) attached to the barrel 26 of the control device 10. In an alternative embodiment, a gyroscope device 40 (see FIG. 5) similar to that utilized in the gyroscopic control devices described above is mounted on the control device 10. In either embodiment, the user is able to play the video game without the need to point the control device at the display and is not confined to the area of a mouse pad or sensor array during game play.

Figure 3:
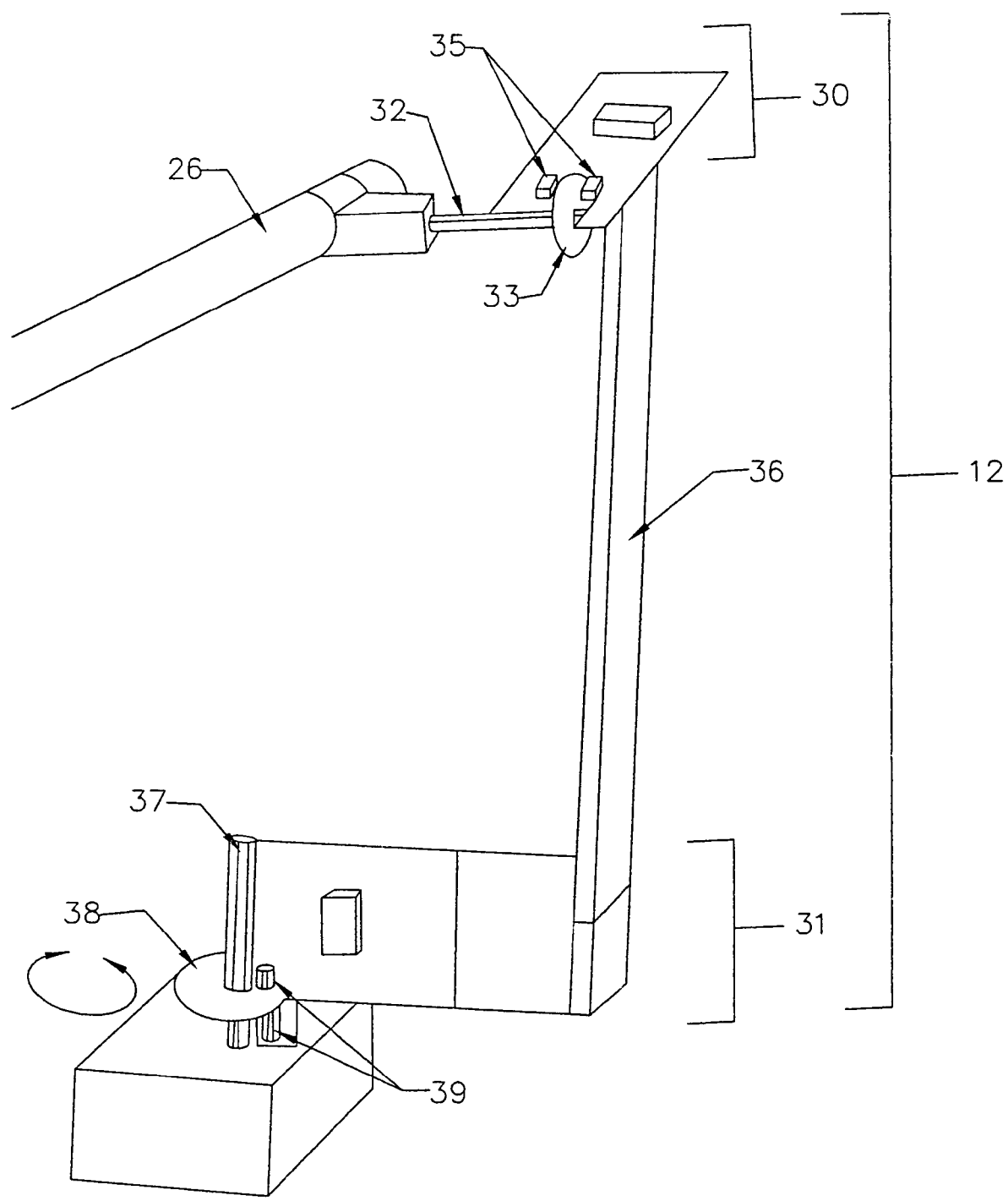
FIG. 3 illustrates a coordinate control unit of a control device according to an embodiment of the present application.

One embodiment of the coordinate control unit 12 is illustrated in further detail with reference to FIG. 3. As noted above, the coordinate control unit 12 may be incorporated into a bipod 25 attached to the barrel 26 of the control device 10. Utilizing this embodiment, the user will preferably mount the bipod 25 on a surface, such as a table, to stabilize the control device.

The coordinate control unit 12 may include a y-axis sensor 30 and an x-axis sensor 31 that detect movement of the barrel in the y-direction, pitch, and in the x-direction, yaw, respectively. More specifically, the y-axis sensor 30 and the x-axis sensor 31 determine the tilt of the barrel 26 in the y-direction and the x-direction, respectively. A first end of a horizontal shaft 32 may be attached to the barrel 26. A second end of the horizontal shaft 32 may be connected to an optical encoding disk 33. As the barrel 26 tilts up and down, the horizontal shaft 32 rotates and the optical encoding disk 33 rotates with the horizontal shaft 32. Optical encoders 35 may be mounted on a printed circuit board in the main body of the y-axis sensor 30. The optical encoders 35 determine the tilt of the barrel 26 in the y-direction, that is, up and down, on the rotation of the encoding wheel 33. Based on the vertical tilt of the barrel 26, the desired vertical point of view of the user in the video game is determined. Similarly, the desired vertical position of a cursor on the display may be determined based on the vertical tilt of the barrel 26.

The y-axis sensor 30 is preferably mounted on a top end of a vertical strut 36. The bottom of the vertical strut 36 may be connected to the x-axis sensor 31. More specifically, the bottom end of the vertical strut 36 may be is connected to a vertical shaft 37. The vertical shaft 37 may be connected to a second optical encoding disk 38. As the barrel 26 moves or tilts horizontally, the vertical shaft 37 rotates, in turn, rotating the second optical encoding disk 38. A second set of optical encoders 39 may be mounted on a printed circuit board of the main body of the x-axis sensor 31 to determine the desired horizontal point of view of the user in the video. The x-axis sensor may be used to determine the desired horizontal position of a cursor on the display of the computer system. In this manner, the coordinate control unit 12 provides information regarding the pitch and yaw of the barrel which is then utilized to determine the desired point of view of the user on the display of the computer system.

Where the control unit is shaped like a game pad, it is unnecessary to implement the coordinate control unit as a bipod as described above. A simple stand that incorporates the x-axis sensor 31 and y-axis sensor 30 as described above provides a stable platform on which the rest the control device 10 while at the same time acting as the coordinate control unit. In this embodiment, the horizontal shaft 32 is preferably connected to the control device 10 on a side surface or bottom surface of the connected end 201 or one of the free ends 200, 200A of the game pad. The stand may be similar in construction to that illustrated in FIG. 3.

Figure 3A:
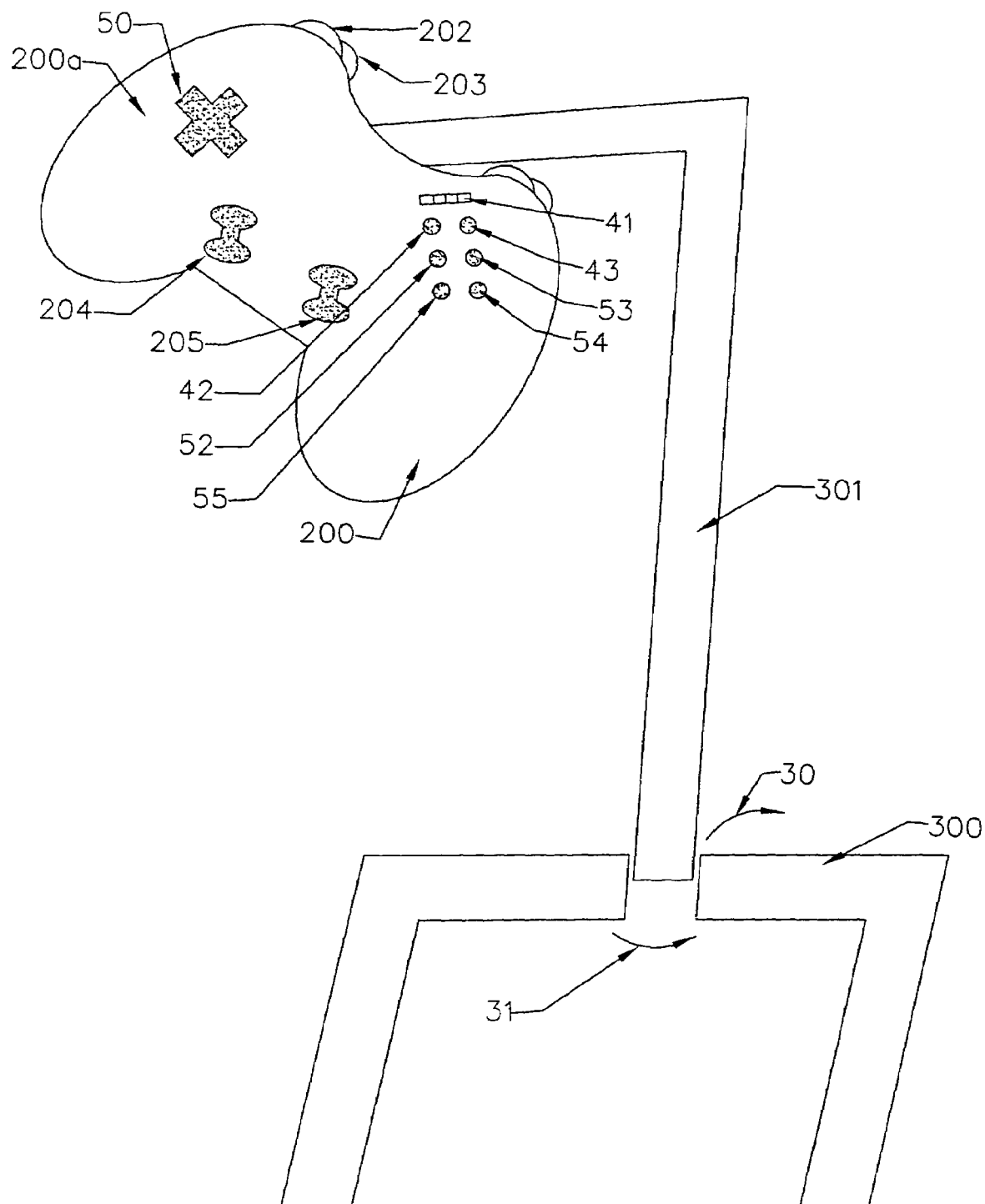
FIG. 3A illustrates a coordinate control unit of a control device according to another embodiment of the present application.

An alternative embodiment of the stand is described with reference to FIG. 3A. A u-shape base 300 houses the y-axis sensor 30 and the x-axis sensor 31. A connecting strut 301 is connected at its bottom end to the base 300. The control device 10 is preferably detachably connected to the top end of the connecting strut 301. As the control device 10 tilts up or down, the connecting strut 301 rotates backward or forward. The y-axis sensor 30 determines the vertical tilt of the control device based on this rotation in a manner similar to that described above. As the control device 10 rotates left and right, the x-axis sensor 31 determines the horizontal tilt of the control device in a manner similar to that described above. The base 300 may be fastened to a surface using a clip or clamp (not shown) to improve its stability if desired. While FIG. 3 illustrates a stand used with the fire arm form of the control device 10 and FIG. 3A illustrates a stand used with the game pad form of the control device, it is noted that both the fire arm form and the game pad form of the control device may be used with either of the stands illustrated in FIG. 3 and FIG. 3A. Alternatively, the connecting strut 301 may extend out horizontally from the base 300.

Alternatively, the coordinate control unit 12 may be implemented using a gyroscope 40 (see FIG. 5) similar to that proposed in the gyroscopic input devices discussed above. Similarly, a gyroscope 210 may be incorporated into the control device 10 configured as a game pad as illustrated in FIG. 2A for example. Where gyroscopes are used, the bipod 25 or stand is not necessary. In one embodiment, the gyroscope 40, 210 such as the solid state gyroscope mounted on a printed circuit board may be mounted on the control device. As noted previously, gyroscopes have been used for many years in the aviation industry to determine pitch and yaw of aircraft. A solid state gyroscope such as that mentioned above may be utilized to determine the pitch and yaw of the control device 10 in the present application. The operation of gyroscopes is well known in the art and thus will not be discussed in detail herein. However, a brief discussion of the operation of gyroscopes may be useful in understanding the present invention.

Typically, a gyroscope includes a rotating disk, rotating about an axis of rotation and mounted on a frame rotatable on one or two axes perpendicular to the axis of rotation of the disk. The spinning disk may be a rotating electric motor. The axis of rotation of the motor is typically aligned with the gravity vector. If a force is applied along the axis of rotation of the motor, the force is resisted due to the constant angular momentum of the spinning disk. As a result, the frame will rotate along an axis perpendicular to the axis of rotation of the motor. The rotation of the frame can be monitored. Thus, for example, where a forward tilting force is applied to the gyroscope, a forward force is applied to the top of the axis of rotation of the motor, and a rearward force is applied to the bottom of the axis of rotation of the motor. The constant angular momentum of the spinning motor opposes these forces and the shaft of the motor will rotate in a direction perpendicular to the applied force. Since the frame is free to rotate along the axis perpendicular to the axis of rotation of the motor, the frame rotates. The direction of this rotation depends on the direction of rotation of the spinning motor. The rotation of the frame is proportional to the tilt of the frame forward. Thus, based on the rotation of the frame, it is possible to determine the tilt of the gyroscope. Where the frame is free to rotate about two axes perpendicular to the axis of rotation of the motor, tilting up and down and left and right can be correlated to the rotation of the frame about either axis. Alternatively, a second gyroscope that is mounted on a frame free to rotate in another direction perpendicular to the axis of rotation of the motor may be incorporated to determine tilt in the horizontal direction. In the present application, solid state gyroscopes are preferably used, which do not typically utilized motors as described above, but works on the same principle to provide pitch and/or yaw information.

Utilizing the solid state gyroscope, for example, mounted on the control device 10, the vertical and horizontal tilt of the control device can be determined. In this manner, the desired point of view of the user in the video game or the desired position of a cursor on the display of the computer system can be determined. As noted above, there are presently available control devices that utilize gyroscopes to determine the pitch and yaw of the device. The gyroscope used in such a device may be used as the gyroscope of the present invention. The gyroscope 210 can similarly be mounted on the control device 10 where the control device is a game pad as noted above. In this case, the gyroscope is preferably mounted in or on the connected end 201.

The inclusion of the gyroscope 210 eliminates the need for a bipod or stand as described above. However, it may be preferable to use the stand in order to aid stability for the user. In addition, use of the stand allows the user to release the control device 10 without altering the point of view of the user in the video game. Thus, the user is able to take a break from game play without altering his or her view in the game.

Figure 4:
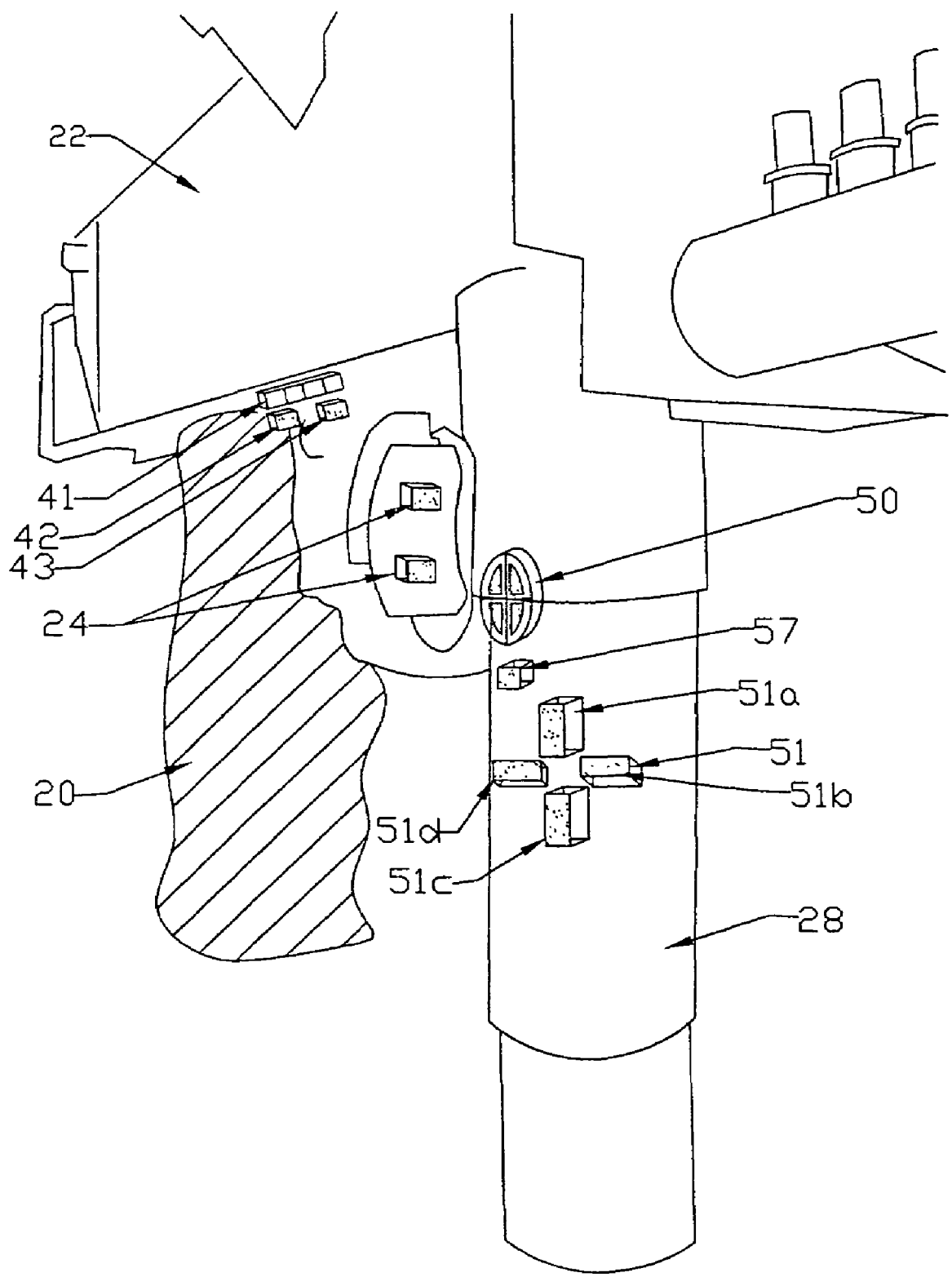
FIG. 4 illustrates a mouse control unit of a control device according to an embodiment of the present application.

The mouse control unit 12 preferably provides for functions commonly provided by conventional computer mouse and is described with reference to FIG. 4. In a preferred embodiment, a mouse wheel 41 is mounted on the central body 22 of the control device 10, preferably on a side of the central body above the trigger 24. A mouse wheel is commonly incorporated into a conventional computer mouse to allow a user to easily scroll up or down on the display or through a menu illustrated on the display. Similarly, the mouse wheel 41 of the present disclosure may be utilized to allow the user to scroll through a menu in the video game or any other computer application. Two buttons 42, 43 may be mounted under the mouse wheel 41. These buttons may function as the left mouse button 42 and right mouse button 43, commonly incorporated in a computer mouse for making selections on menus, selecting text, calling up menus or the like. In a preferred embodiment, the mouse wheel 41, the left mouse button 42 and right mouse button 43 are positioned above the trigger 24 such that they can be easily reached and manipulated by a finger of the user that may also be used to pull the trigger or triggers 24 of the control device 10. The information related to the vertical and horizontal tilt of the control device 10 may be utilized to provide information regarding the vertical and horizontal position of a cursor on the display such that the control device is capable of performing all the same functions of a computer mouse.

The mouse control unit 14 may similarly be incorporated into the game pad embodiment if desired. Preferably, the mouse control unit 14 is mounted on the connected end 201 of the control pad, on the top surface and substantially centered. In this embodiment, the left mouse button 42 and right mouse button 43 are preferably positioned slightly forward of the mouse wheel 40 as seen in FIG. 2A. Alternatively, the mouse control unit 14 may be positioned on the top surface of the connected end 201 of the control pad slightly off center such that the mouse control unit 14 is easily operated by a thumb of the user. That is the left mouse button 42, right mouse button 43 and mouse wheel 41 may be positioned above the game play controls 52, 53, 54, 55 (discussed below) for example and may be easily activated using the same thumb used by the user to activate the game play controls.

Figure 5:
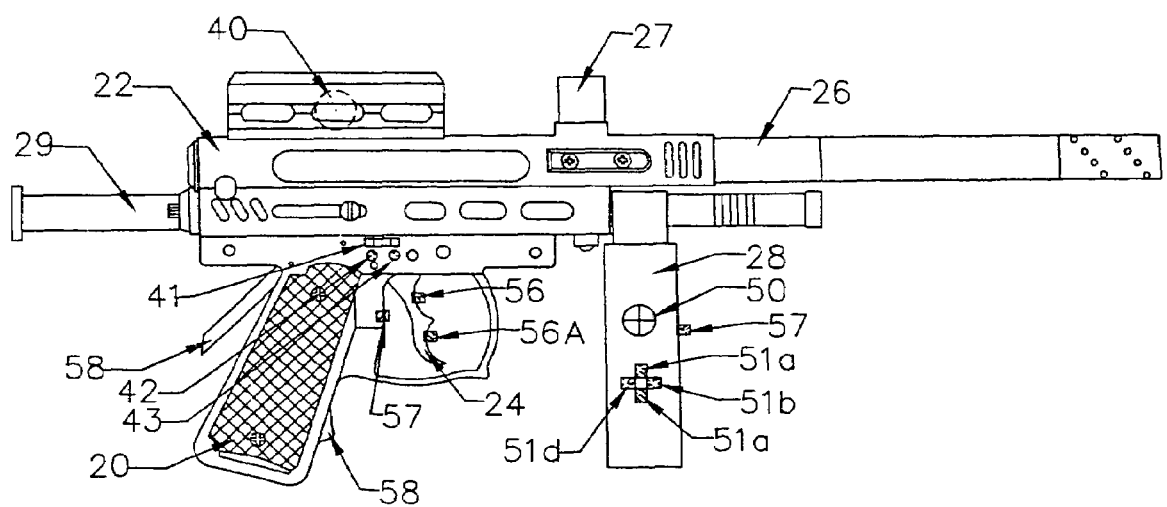
FIG. 5 illustrates a control device including a game play control unit according to an embodiment of the present application.

The game play control unit 16 preferably includes game play controls and is illustrated in FIG. 5. Game play controls include controls for inputting information related to other aspects of the video game, for example, character movement in space in the video game, also referred to as longitudinal and lateral movement. A hat switch 50 and/or a directional switch 51 are preferably used to control the lateral and longitudinal movement of a character in the game. While the hat switch 50 and the directional switch 51 may both be used to control lateral movement, they function in a slightly different manner. The hat switch 50 typically includes four momentary contact switches with a pad mounted over them. Each momentary contact switch is activated when the user presses down on the section of the pad that is over the respective momentary contact switch. Typically, only one momentary contact switch may be activated at a time, that is, input from more than one momentary contact switch is generally ignored. The directional switch 51, however, typically allows input regarding motion in two directions at the same time. The direction switch 51 preferably includes four independent contact switches 51*a*, 51*b*, 51*c*, 51*d*, generally in a diamond shaped configuration. Each of the independent contact switches 51*a*, 51*b*, 51*c*, 51*d* typically is used to provide for movement in a particular direction in the video game. Unlike the hat switch 50, users are generally able to activate more than one of the contact switches at the same time. More specifically, most video games will allow for movement in the right and forward direction at the same time, for example. The result is diagonal movement in the video game. For example, conventional video games will allow such movement when the keyboard is used as the control device. The independent contact switches 51*a*, 51*b*, 51*c*, 51*d* of the directional switch 51 may mimic such control from the keyboard. This allows a user of the video game to move the character forward, backward, left, right and diagonally in space in the video game environment. In addition, where the user uses the hat switch 50 for longitudinal and lateral movement in the vide game, for example, the direction switch 51 may be used for other functions which increases the flexibility of the control device 10. Alternatively, where the direction switch 51 is used longitudinal and lateral movement in the video game, for example, the hat switch 50 may be used for other functions.

In addition, game play controls may include a jump button 52, a run button 53, a crouch button 54 and a special action button 55. These game play controls may be positioned on a side surface of the hand grip 20 of the control device 10 such that they are easily operated by the thumb of the user as it wraps around the hand grip (See FIG. 5A). A shoot button 56 may also be considered a game play control, and will be explained in further detail below. Naturally, different games may have different game play options, and thus, it is impossible to list all possible game play controls, however, the control device of the present application is intended to be compatible with most every video game.

A coordinate activation button 57 is preferably included in the game play control unit 16. The activation button 57 activates the input of information from the coordinate control unit 12 while depressed. That is, ordinarily the information from the coordinate control unit is not used to control the display of the computer system. In this manner, inadvertent jostling or movement of the control device 10 by the user is not used to alter the point of view of the user in the video game or the position of the cursor on the display. The user depresses the activation button 57 when they wish to change the point of view or position of the cursor. Generally, this operation is intuitive to the user in that the user depresses a button when he or she desires to change the display of the computer system and otherwise inadvertent movements do not affect the display of the computer screen. In this manner, a user can reposition the control device for comfort without changing the point of view of the user in the computer game or the position of the cursor on the display. Alternatively, the activation button 57 may be used as a kill button, that is, the information from the coordinate control unit 12 is utilized to control the display normally, unless the kill button is depressed. This is slightly less intuitive for a user, however, it sill provides a way for the user to adjust his or her position or grip without affecting the display of the computer system when necessary. In addition, the activation button 57 may be a lever type switch positioned on the rear or front of the hand grip 20.

The game play control unit 16 may be mounted on the optional fore grip 28 of the control device 10 which can be grasped by the user. These controls are preferably positioned on the fore grip 28 such that they are under the fingers of a user gripping the fore grip. More specifically, the hat switch 50 or directional switch 51 may be positioned under or adjacent to the thumb of the user, while the other of the directional or hat switches may be positioned under or adjacent to the fingertips of the user on the hand grip 20. The fore grip 28 is preferably adjustably attachable to the barrel 26 of the control device 10 such that it can be moved forward or backward on the barrel in accordance with the preference of the user. The activation button 57 may be positioned on the fore grip as well (See FIG. 5).

Figure 7:
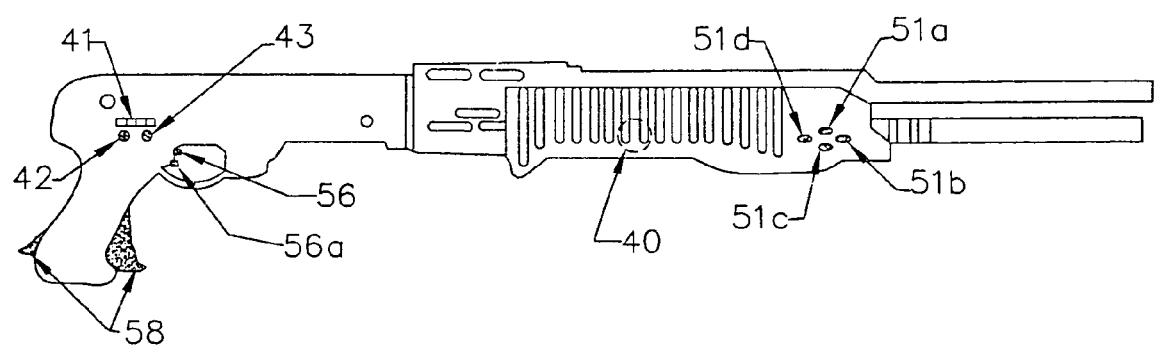
FIG. 7 illustrates a control device including a game play control unit according to an embodiment of the present invention.
Figure 7A:
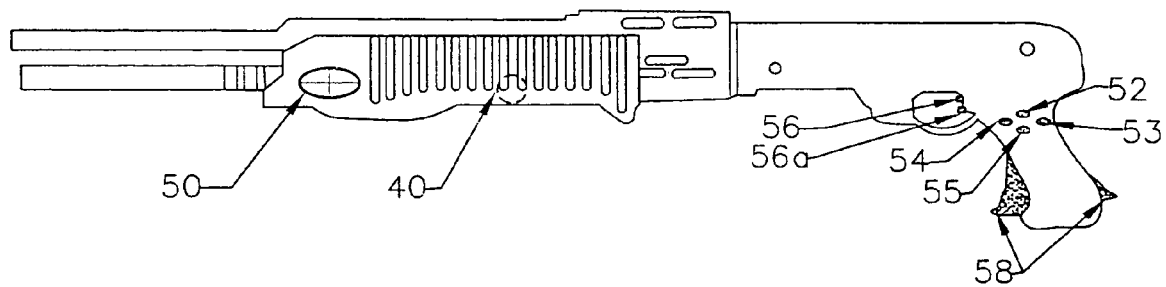
FIG. 7A illustrates a 7 illustrates a control device including a game play control unit according to an embodiment of the present invention.

Alternatively, the game play control unit 16 may be positioned on the barrel 26 of the control device. Preferably, the direction switch 51 is positioned on one face of the barrel such that the contact switches 51*a*, 51*b*, 51*c*,51*d* are easily activate by the fingers on the user cradling the barrel (See FIG. 7). The hat switch 50 may be positioned on the opposite face such that it is easily activated by the thumb of the user (See FIG. 7A).

As noted above the shoot button 56 may generally be considered a game play control, however, in a preferred embodiment of the present application, the shoot button is positioned in the trigger 24 of the control device 10. In order to increase the realism of the control device 10, it is preferable to mount the shoot button 56 in the trigger 24. A second shoot button 56*a* may also be positioned in the trigger 24. Such a second button may be useful where a video game provides a user with two weapons, for example. Alternatively, the trigger 24 itself may be used as the shoot button 56 or buttons such that pulling back either trigger corresponds to firing a primary and/or secondary weapon in the video game. In addition, as noted above, a second independent trigger may be included and used as the second shoot button 56*a*.

Figure 5A:
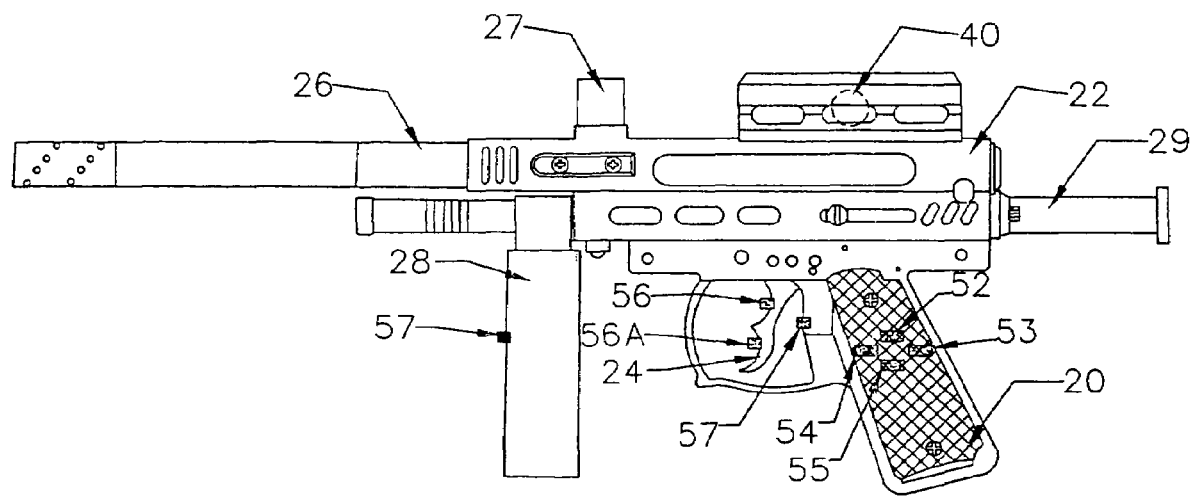
FIG. 5A illustrates a control device including a game play control unit according to an embodiment of the present application.

The game play control unit 16 may be positioned on the hand grip 20 of the control device 10 such that the controls are easily manipulated by the user gripping the hand grip (See FIG. 5A). The controls are preferably positioned on the hand grip 20 such that the buttons 52, 53, 54 and 55 are easily manipulated by a thumb of the user. An embodiment such as this may be particularly useful where the shape of the control device 10 is a pistol and it would be inconvenient to utilize a fore grip.

As noted above, where the control device 10 is shaped like a game pad, the game play control unit 16, is preferably mounted on the top surface of the connected end 201 of the game pad and additional game play controls may be mounted on the front surface of the connected end, generally called "shoulder" buttons. In a preferred embodiment, a hat switch 50 or direction switch 51 may be positioned on the left side of the connected end 201 within easy reach of a left thumb of the user. The other game controls, 52, 53, 54 and 55 are preferably positioned on the right side of the connected end 201 within easy reach of a right thumb of the user. Additional game control may be positioned on the front surface of the connected end 201 of the game pad. In a preferred embodiment, these game controls include various activity buttons including the shoot button 56 and the coordinate activation button 57, which may be positioned on the right front surface of the connected end such that they can be depressed by the right index finger of the user. Similarly additional game controls 202, 203 may be positioned on the front left surface of the connected end. Further, it is common for game pads to include two small analog or digital joysticks, 204, 205 positioned for easy manipulation by the left and right thumb of the user, respectively. Typically, either of these joysticks 204, 205 or the hat switch or directional button 50, 51 are utilized to change the point of view in the video game, however, since that function is performed based on pitch and yaw information provided by the coordinate control unit 12, a different function can be assigned to the control traditional used. Alternatively, one of these controls can be eliminated, although it is advantageous to provide many game controls in order to control modern video games.

In either the firearm embodiment or the control pad embodiment a lever type button 58 may be included to provide input when pressure is applied. In the firearm embodiment, the lever type button 58 may be positioned on the rear of the hand grip 20 such that it can be easily activated by the hand of the user gripping the hand grip. The lever type button may also be positioned on a front side of the hand grip 20 on the lower portion below the trigger 24. In the game pad embodiment, the lever type button is preferably positioned on one of the free ends 201,201*a* of the game pad on either the top or bottom surface thereof. The lever type button 58 is preferably utilized as the coordinate activation button 57. In this case the button 57 described above may be used to control another function.

The controller 18 processes information provided by the coordinate control unit 12, the mouse control unit 14, and the game play control unit 16 to provide information to the computer system. In a preferred embodiment, the controller 18 is a microprocessor or microchip. The controller 18 may be a microchip similar to that utilized in conventional joysticks. Data provided by the coordinate control unit 12 is utilized to provide information to the computer system related to the desired point of view of the user or desired vertical and horizontal position of the cursor on the display. Information provided by the mouse control unit 14 is utilized to provide information related to conventional mouse functions such as scrolling through and selecting information displayed on the display. Information provided by the game play control unit 16 is utilized to provide information related to additional game play options or actions. Using such a controller 18, the control device 10 can be connected to the computer system via a USB port, as is common for conventional joysticks. The control unit 10 of the present application is compatible with most commercially available joystick microchips. Alternatively, a custom designed microchip maybe utilized as the controller 18.

The control device 10 of the present application may be compatible with conventional joystick or game pad microchips and thus may not require any special software for operation with the computer system. That is, no special drivers may be necessary to integrate the control device with the computer system. Similarly, the control device of the present disclosure is preferably compatible with default software commonly provided with conventional computer systems. Of course, software could be written specifically for the control device 10 of the present disclosure to enable all buttons, meaning that the user may select what function each of the game play controls of the device controls. This software preferably includes driver software to allow for detection of the device by the operating system of the computer system, for example for detection by Windows®, a registered trademark of Microsoft Corporation. In addition, the software preferably includes programming software to allow the user to program individual controls and to create custom files for individual games, for example.

While the present disclosure discloses specific locations for the various game play controls, it is noted that the game play controls can be configured in most any way, depending on the desire of the user.

The control device 10 may be connected via a USB cable to a USB port of the computer system as mentioned above, or may be connected via a wireless or optical link. Both wireless and optical links for computer systems are presently available. In this embodiment, a battery may be provided to power the control unit 10, such that the control unit can be completely wireless.

Figure 1A:
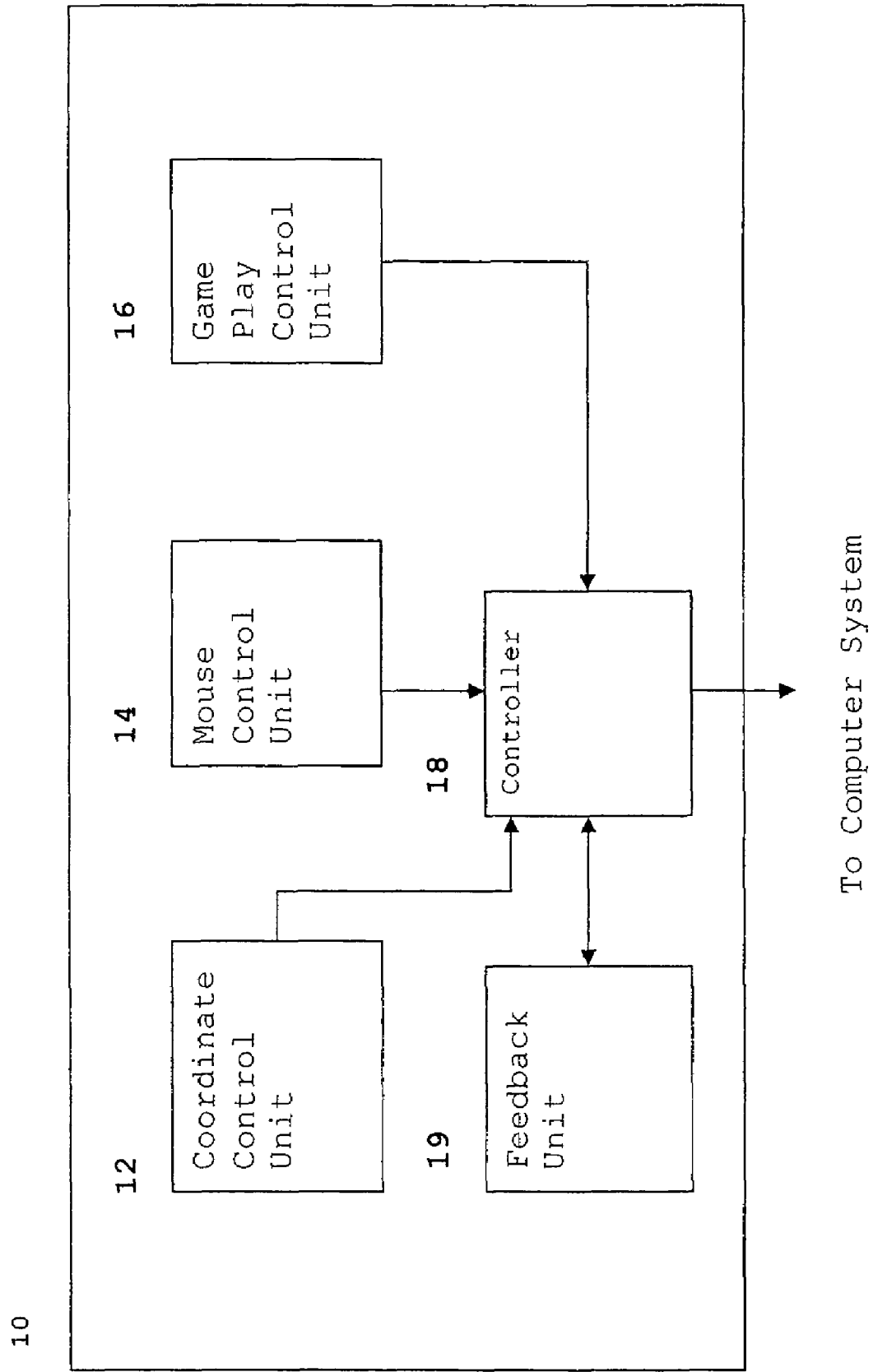

The control device may also include a feedback unit 19 (see FIG. 1A). The feedback unit provides added elements of reality, by providing tactile feedback to the user. For example, the feedback un it may be utilized to cause a vibration in the control device 10 when the fire button 56 is depressed to simulate the recoil of a firearm. Similarly, the control device may be vibrated to simulate an injury to the character in the video game. Such feedback is commonly available in conventional control devices.

The control device 10 may also include a small display unit 27 (see FIG. 2) that replicates or adds to the information provided on the display of the computer system. For example, the display unit may act as a heads up display or HUD to provide certain information to the user that is more easily visible on the display unit than on the display of the computer system. The display unit may also be utilized to recreate the image on the display of the computer screen, such that the user need not necessarily sit in front of the display of the computer screen to play the game.

A method for controlling a display of a computer system for use with a video game according to an embodiment of the present disclosure is described with reference to FIG. 6. At step S60 information related to the vertical and horizontal tilt of the control device is received. Mouse input information is received at step S62. Game play information is received at step S64. At step S66, the input information related to vertical and horizontal tilt of the control device, the mouse input information and the game play information are processed and game information is provided to the computer system. The coordinate information may be utilized to provide information related to a desired vertical and horizontal point of view of the user in the video game or to indicate a desire vertical and horizontal position of a cursor on a display f the computer system.

Figure 6:
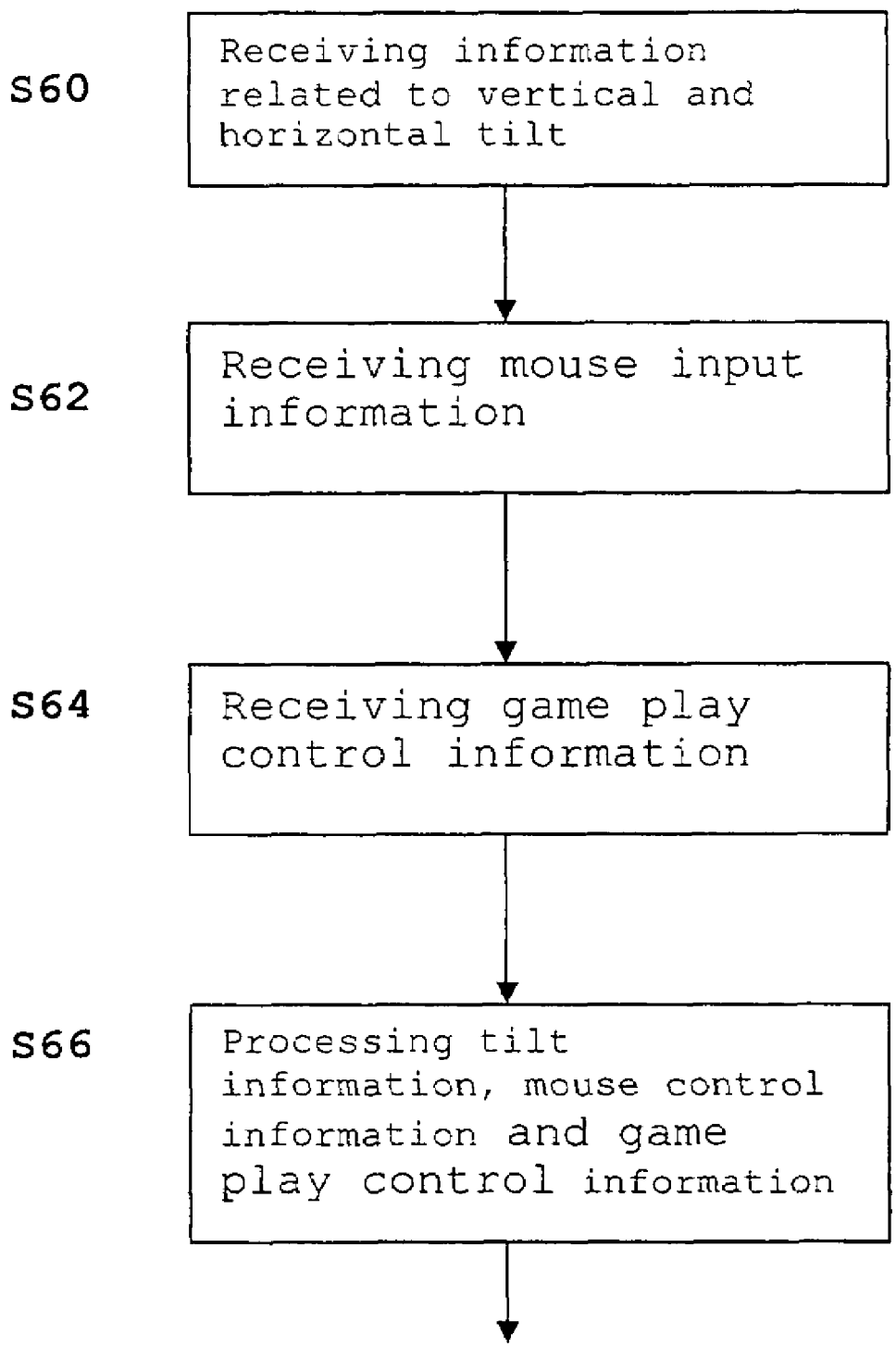
FIG. 6 is a flow chart illustrating a method of positioning a cursor on a display of a computer system according to an embodiment of the present application.

The method of FIG. 6 is substantially implemented by the control device 10 described above and is not discussed in further detail herein.

While the present application discloses specific embodiments of a method and control device for controlling display of a computer system, it should be understood that many variations are possible. The present application is intended to extend to all such variations permissible under the claims appended hereto.

What is claimed is:

1. A control device for operation by a user for controlling a display of a computer system for use with a video game, the control device comprising:
    a housing having a shape adapted to be handled by a user of a video game;
    a coordinate control unit including a motion sensor included within said housing, said housing being adapted to be handled by the user for generating input information related to a vertical and a horizontal tilt of the control device;
    a game play control unit included within said housing adapted to be handled by the user for generating game play input information; and
    a controller adapted to process the input information from the coordinate control unit to provide to the computer system point of view information of an avatar in a video game virtual environment, and adapted to process said input information from the game play control unit to provide to the computer system game play information representative of at least changes in latitudinal and longitudinal position of the avatar in the video game virtual environment, thereby creating a unified representation of changes of the point of view of the avatar within the video game virtual environment, which unified representation encompasses both horizontal and vertical changes of the avatar's point of view within the video game virtual environment in response to handling by the user of the control device while not within the video game virtual environment, as well as latitudinal and longitudinal changes of the avatar's position as expressed within the point of view of the video game virtual environment, in response to handling by the user of the game play control unit while not within the video game virtual environment.

2. The control device of claim 1, wherein the housing of said control device has a shape substantially similar to a firearm comprising:
    a central body,
    a handgrip extending downward from a rear section of the central body, and
    a barrel extending longitudinally forward from the central body.

3. The control device of claim 2, wherein the coordinate control unit further comprises:
    a y-axis sensor adapted to input information regarding a tilt of the barrel of the control device in a vertical direction; and
    an x-axis sensor adapted to input information regarding a tilt of the barrel of the control device in a horizontal direction.

4. The control device of claim 3, wherein the y-axis sensor further comprises:
    a horizontal shaft attached to a side of the barrel that rotates as the barrel is tilted upward and downward;
    a first optical disk attached to the horizontal shaft such that the optical disk rotates with the horizontal shaft; and
    at least one optical encoder adapted to correlate rotation of the optical disk to vertical tilt of the barrel to provide information indicating a desired vertical point of view of the avatar in the video game virtual environment.

5. The control device of claim 3, wherein the x-axis sensor further comprises:
    a vertical shaft connected to the y-axis sensor such that the vertical shaft rotates as the barrel is tilted left and right;
    a second optical encoder disk attached to the vertical shaft such that the second optical disk rotates with the vertical shaft; and
    at least one second optical encoder adapted to correlate the rotation of the second optical disk to a horizontal tilt of the barrel to provide information indicating a desired horizontal point of view of the avatar in the video game virtual environment.

6. The control device of claim 1, wherein the coordinate control unit further comprises:
    at least one gyroscope adapted to provide input information regarding the vertical and horizontal tilt of the control device in order to provide information regarding a desired vertical and horizontal point of view of the avatar in the video game virtual environment.

7. The control device of claim 1, wherein the coordinate control unit further comprises:
    at least one gyroscope adapted to provide information regarding the vertical and horizontal tilt of the control device in order to provide information regarding a desired vertical and horizontal position of a cursor on the display of the computer system.

8. The control device of claim 1, further including a mouse type of control unit adapted to be operated by the user in order to generate computer mouse type input information, wherein the mouse type control unit comprises:
    a rotatable mouse wheel adapted to provide information upon rotation to cause scrolling up or down on the display;
    a left mouse button adapted to provide information regarding selections of the user; and
    a right mouse button adapted to provide information regarding other selections of the user.

9. The control device of claim 8, further including:
    a trigger extending downward from the central body in front of at least a portion of the handgrip; and
    wherein the mouse wheel, the left mouse button and the right mouse button are mounted on a side of the central body of the control device such that positioning a finger of the user proximate to the trigger operates the mouse wheel, left mouse button and right mouse button.

10. The control device of claim 2, wherein the game play control unit comprises:
    a directional controller adapted to generate input information regarding longitudinal and lateral movement in space;
    a plurality of buttons adapted to provide information regarding a plurality of actions performed on the display, the plurality of actions including two or more of running, crouching, jumping and special actions; and
    a coordinate activation button adapted to selectively enable and disable input of information from the coordinate control unit to the computer system.

11. The control device of claim 10, wherein the plurality of buttons are positioned on the handgrip of the control device such that the plurality of buttons are operable by fingers of the hand of the user gripping the handgrip.

12. The control device of claim 11, further comprising:
    a foregrip, positioned forward from the handgrip of the weapon, wherein the directional controller is positioned on the foregrip and is operable by a thumb and fingers of a another hand of the user gripping the foregrip.

13. The control device of claim 11, wherein the directional controller is positioned on the barrel of the control device.

14. The control device of claim 2, further including a trigger extending downward from the central body in front of at least a portion of the handgrip; and wherein the game play control unit further comprises a shoot button mounted on the trigger of the control device.

15. The control device of claim 2, further comprising a removable shoulder stock extending behind the central body of the control device and adapted to steady the control device against a shoulder of the user.

16. The control device of claim 1, further comprising a display unit mounted on the control device to provide additional image information to a user of the control device.

17. The control device of claim 1, further comprising a feedback unit adapted to provide tactile feedback to a user of the control device.

18. A method for allowing a user to control a video game display of a computer system, comprising:
providing a video game control device with a housing having a shape adapted to be handled by a user of a video game;
generating within the housing information from a motion sensor which is included within a coordinate control unit portion of the video game control device, said information being related to a vertical and a horizontal tilt of the video game control device and being representative of point of view information of an avatar in a displayed video game virtual environment;
generating within the housing information from a game play control unit portion of the video game control device, said information being representative of at least changes in latitudinal and longitudinal position of the avatar in the displayed video game virtual environment; and
providing game information for controlling the video game virtual environment display of the computer system based on information generated by the coordinate control unit and providing game information for controlling the video game virtual environment display of the computer system based on information generated by the game play control unit , thereby creating a unified representation of changes of the point of view of the avatar within the video game virtual environment, which unified representation encompasses both horizontal and vertical changes of the avatar's point of view within the video game virtual environment in response to handling by the user of the control device while not within the video game virtual environment, as well as latitudinal and longitudinal changes of the avatar's position as expressed within the point of view of the video game virtual environment, in response to handling by the user of the game play control unit while not within the video game virtual environment.

19. The method of claim 18, wherein the control device has a shape substantially similar to a firearm comprising:
a central body;
a handgrip extending downward from a rear section of the central body;
a barrel extending longitudinally forward from the central body; and
a trigger extending downward from the central body in front of the handgrip, and where:
the fingers or thumb of one hand of the user, positioned on one of the handgrip, foregrip or barrel, operate one or more buttons adapted to provide input information regarding longitudinal and lateral position of the avatar in the displayed video game virtual environment, while the fingers or thumb of the other hand of the user, positioned on a different one of the handgrip, foregrip or barrel, operate one or more buttons adapted to provide input information regarding a plurality of actions performed by the avatar in the displayed video game virtual environment, the plurality of actions including one or more of running, crouching, jumping and selecting weapons, wherein both hands, in addition to providing the above-noted operation, provide stability to the device with respect to the vertical and horizontal tilt of the control unit, as well as reducing fatigue in wielding the control device in a manner similar to a real firearm.

20. The method of claim 19, wherein the step of generating information related to the vertical and horizontal tilt of the control device comprises:
generating information regarding a tilt of the barrel relative to a centered vertical position of the control device from a y-axis sensor; and
generating information regarding a tilt of the barrel relative to a centered horizontal position from an x-axis sensor.

21. The method of claim 20, wherein the step of generating information from the y-axis sensor further comprises:
attaching a horizontal shaft to a side of the barrel that rotates as the barrel is tilted upward and downward;
connecting a first optical disk attached to the horizontal shaft such that the optical disk rotates with the horizontal shaft; and
providing at least one optical encoder adapted to correlate rotation of the optical disk to vertical tilt of the barrel to provide information indicating a desired vertical point of view of the avatar in the video game virtual environment.

22. The method of claim 21, wherein the step of generating information from the x-axis sensor further comprises:
connecting a vertical shaft to the y-axis sensor such that the vertical shaft rotates as the barrel is tilted left and right;
connecting a second optical encoder disk attached to the vertical shaft such that the second optical disk rotates with the vertical shaft; and
providing at least one second optical encoder adapted to correlate the rotation of the second optical disk to a horizontal tilt of the barrel to provide information indicating a desired horizontal point of view of the avatar in the video game virtual environment.

23. The method of claim 18, wherein the step generating information from the coordinate control unit further comprises:
attaching at least one gyroscope to the control device; and
generating information regarding the vertical and horizontal tilt of the control device from the gyroscope in order to provide information regarding the desired vertical and horizontal point of view of the avatar in the video game virtual environment.

24. The method of claim 19, including the further step of providing a mouse control unit with the video game control device for generating mouse control information, wherein the step of generating mouse control information comprises:
generating information related to scrolling up and down on the video game display;
generating information regarding selections of a user from a left mouse button; and generating information regarding other selections of a user from a right mouse button.

25. The method of claim 24, wherein the left mouse button and the right mouse button are mounted on a side of the central body of the control device such that positioning a finger of a user proximate to the trigger operates the mouse left mouse button and right mouse button.

26. The method of claim 19, wherein the step of generating information from a game play control unit comprises:
  generating input information regarding longitudinal and lateral movement of a character on the display in space from a direction control unit;
  generating information regarding a plurality of actions performed by the character on the display, from a plurality of controls; and
  generating activation information from a coordinate activation button to enable input of information from the coordinate control unit.

27. The method of claim 26, wherein the plurality of controls are positioned on the hand grip of the control device such that at least one of the controls is operable by a thumb of the user gripping the handgrip.

28. The method of claim 27, wherein the direction control unit is positioned on a fore grip, extending down from the barrel of the control device and is operable by at least one of a thumb and fingers of a second hand of the user gripping the fore grip.

29. The method of claim 28, wherein the plurality of controls includes a shoot button mounted on the trigger of the control device.

30. The method of claim 19, wherein the control device further comprises a removable shoulder stock extending behind the central body of the control device and adapted to steady the control device against a shoulder of the user.

31. The method of claim 18, further comprising receiving additional image information to be displayed to a user via a display unit.

32. The method of claim 18, further comprising receiving feedback information for providing tactile feedback to a user via a feedback unit.

33. A control device for operation by a user for controlling a display of a computer system for use with a video game, the control device comprising:
  a housing having a shape adapted to be handled by a user of a video game;
  a coordinate control unit including a motion sensor included within said housing, said housing being adapted to be handled by the user for generating input information related to a vertical and a horizontal tilt of the control device;
  a game play control unit included within said housing adapted to be handled by the user for generating game play input information; and
  a controller adapted to process the input information from the coordinate control unit to provide to the computer system point of view information of an avatar in a video game virtual environment, and adapted to process said input information from the game play control unit to provide to the computer system game play information representative of at least changes in latitudinal and longitudinal position of the avatar in the video game virtual environment, thereby creating a unified representation of changes of the point of view of the avatar within the video game virtual environment, which unified representation encompasses both horizontal and vertical changes of the avatar's point of view within the video game virtual environment in response to handling by the user of the control device while not within the video game virtual environment, as well as latitudinal and longitudinal changes of the avatar's position as expressed within the point of view of the video game virtual environment, in response to handling by the user of the game play control unit while not within the video game virtual environment.

34. The control device of claim 33, wherein the control device is substantially u-shaped comprising:
  a first open end;
  a second open end; and
  a connected end connecting the first open end and the second open end.

35. The control device of claim 34, wherein the coordinate control unit further comprises:
  a y-axis sensor adapted to input information regarding a tilt of the control device in a vertical direction; and
  an x-axis sensor adapted to input information regarding a tilt of the control device in a horizontal direction.

36. The control device of claim 35, wherein the y-axis sensor further comprises:
  a horizontal shaft attached to a side of the control device that rotates as the control device is tilted upward and downward;
  a first optical disk attached to the horizontal shaft such that the optical disk rotates with the horizontal shaft; and
  at least one optical encoder adapted to correlate rotation of the optical disk to vertical tilt of the control device to provide information indicating a desired vertical point of view of the avatar in the video game virtual environment.

37. The control device of claim 36, wherein the x-axis sensor further comprises:
  a vertical shaft connected to the y-axis sensor such that the vertical shaft rotates as the control device is tilted left and right;
  a second optical encoder disk attached to the vertical shaft such that the second optical disk rotates with the vertical shaft; and
  at least one second optical encoder adapted to correlate the rotation of the second optical disk to a horizontal tilt of the control device to provide information indicating a desired horizontal point of view of the avatar in the video game virtual environment.

38. The control device of claim 35, wherein the y-axis sensor and the x-axis sensor are positioned in a substantially u-shaped base such that the y-axis sensor detects rotation of a connecting member extending vertically from the base to the control device forward and backward to determine the vertical tilt of the control device and the x-axis sensor detects rotation of the connecting member left and right to determine the horizontal tilt of the control device.

39. The control device of claim 33, wherein the coordinate control unit further comprises:
  at least one gyroscope adapted to provide information regarding the vertical and horizontal tilt of the control device in order to provide information regarding a desired vertical and horizontal point of view of the avatar in the video game virtual environment.

40. The control device of claim 34, further including a mouse control unit adapted to generate computer mouse input information, wherein the mouse control unit comprises:
  a rotatable mouse wheel adapted to provide information upon rotation to cause scrolling up or down on the display;
  a left mouse button adapted to provide information regarding selections of a user; and
  a right mouse button adapted to provide information regarding other selections of a user.

41. The control device of claim 40, wherein the mouse wheel, the left mouse button and the right mouse button are mounted in a substantially centered position on a top surface of the connected end of the control device.

42. The control device of claim 40, wherein the mouse wheel, the left mouse button and the right mouse button are mounted in an off centered position on a top center of the connected end of the control device.

43. The control device of claim 34, wherein the game play control unit comprises:
- a directional controller adapted to input information regarding longitudinal and lateral movement in space positioned on the left side of the top surface of the connected end such that the directional controller is easily manipulated by the left thumb of the user;
- a plurality of buttons adapted to provide information regarding a plurality of actions performed on the display, the plurality of actions including running, crouching, jumping and selecting weapons and positioned on the right side of the top surface of the control device such that the plurality of buttons are easily manipulated by the right thumb of the user; and
- a coordinate activation button adapted to enable input of information from the coordinate control unit while depressed and positioned on a front surface of the connected end of the control device.

44. The control device of claim 33, further comprising a display unit mounted on the control device to provide additional image information to a user of the control device.

45. The control device of claim 33, further comprising a feedback unit adapted to provide tactile feedback to a user of the control device.

* * * * *